United States Patent
Neely et al.

(10) Patent No.: US 9,622,413 B2
(45) Date of Patent: Apr. 18, 2017

(54) AGRICULTUAL HARVESTING HEAD WITH WIPER FOR CROP DIVIDER

(71) Applicant: DEERE & COMPANY, Moline, IL (US)

(72) Inventors: Jesse R. Neely, Annawan, IL (US); Benjamin J. Schlesser, Independence, IA (US); Corwin M. Puryk, Bettendorf, IA (US)

(73) Assignee: Deere & Company, Moline, IL (US)

(*) Notice: Subject to any disclaimer, the term of this patent is extended or adjusted under 35 U.S.C. 154(b) by 68 days.

(21) Appl. No.: 14/851,006

(22) Filed: Sep. 11, 2015

(65) Prior Publication Data
US 2017/0071130 A1  Mar. 16, 2017

(51) Int. Cl.
| | | |
|---|---|---|
| A01D 57/02 | (2006.01) | |
| A01D 63/00 | (2006.01) | |
| A01D 45/02 | (2006.01) | |
| A01D 101/00 | (2006.01) | |

(52) U.S. Cl.
CPC ............ *A01D 63/00* (2013.01); *A01D 45/021* (2013.01); *A01D 2101/00* (2013.01)

(58) Field of Classification Search
CPC ........ A01D 57/03; A01D 57/02; A01D 45/00; A01D 57/12; A01D 61/002; A01D 63/02
USPC .......................................................... 56/226
See application file for complete search history.

(56) References Cited

U.S. PATENT DOCUMENTS

| | | | | |
|---|---|---|---|---|
| 2,497,729 | A * | 2/1950 | Tallman | A01D 57/03 56/226 |
| 3,698,166 | A * | 10/1972 | Fisher | A01D 57/02 56/220 |
| 5,007,235 | A * | 4/1991 | Nickel | A01D 57/03 384/281 |
| 5,595,053 | A * | 1/1997 | Jasper | A01D 57/02 56/226 |
| 6,708,475 | B2 * | 3/2004 | Guyer | A01D 57/03 56/220 |
| 6,843,045 | B2 * | 1/2005 | Bickel | A01D 57/03 56/14.4 |
| 6,910,323 | B2 * | 6/2005 | Bickel | A01D 57/02 56/220 |
| 7,131,253 | B2 * | 11/2006 | Remillard | A01D 63/02 56/14.4 |
| 7,650,737 | B1 * | 1/2010 | Lovett | A01D 57/02 56/220 |
| 8,387,351 | B2 * | 3/2013 | Guyer | A01D 57/00 56/226 |
| 8,590,284 | B2 * | 11/2013 | Rayfield | A01D 57/03 56/226 |
| 9,526,209 | B2 * | 12/2016 | Honey | A01D 57/12 |

* cited by examiner

*Primary Examiner* — Arpád Fábián-Kovács

(57) ABSTRACT

An agricultural harvesting head comprises a frame, crop dividers located at each end of the frame, and a reel supported on the frame between the crop dividers wherein a disk at at least one end of the reel has a wiper mounted upon it that wipes against the surface of a crop divider as the reel and disc rotate during harvesting, and in this manner helps clear the crop divider of crop plants that might otherwise become hair pinned on the crop divider. Wipers can be provided on discs at both ends of the reel to thereby keep both crop dividers clear.

13 Claims, 4 Drawing Sheets

AGRICULTUAL HARVESTING HEAD WITH WIPER FOR CROP DIVIDER

FIELD OF THE INVENTION

The invention relates to agricultural harvesting heads. More particularly, it relates to crop fouling of agricultural harvesting heads. Even more particularly, it relates to devices for preventing crop buildup on crop dividers of agricultural harvesting heads

BACKGROUND OF THE INVENTION

Agricultural harvesting heads such as corn heads or draper heads that are mounted on agricultural combines are prone to be filed by accumulations of crop plants. One particular problem area is crop dividers.

Crop dividers are typically pointed plastic structures that extend forward in the direction of travel and divide the crop the way a comb divides hair. They split the crop planted in the ground into two portions: a portion that is directed into the harvesting apparatus for harvesting, and a portion that remains standing in the field for harvesting in a later pass through the field.

Crops such as corn may become tangled in their upper reaches and thus are not easily divided around the crop divider. As a result, the plants are uprooted rather than divided and they fold across the top and down the sides of the crop divider itself.

Over time, this "hair pinning" builds up into a thick mat until it blocks the smooth flow of crop into the agricultural harvesting head.

What is needed is an apparatus that more efficiently prevents the accumulation of crop plants on the crop divider. It is an object of this invention to provide such an apparatus.

SUMMARY OF THE INVENTION

In accordance with a first aspect of the invention, a wiper is fixed to a reel of an agricultural harvesting head to wipe against the crop divider, thereby lifting and removing crop plants that are folded over the crop divider. As the reel rotates the wiper travels rearward and upward across the surface of the crop divider wiping the surface of the crop divider clean of crop plants that are folded over the crop divider.

Several of these wipers may be mounted on the reel. These wipers may be spaced equiangularly and equidistantly from each other such that one rotation of the reel (which is the equivalent of approximately 4 m of travel over the ground) causes several repeated wipes of the crop divider by several different wipers.

In accordance with a second aspect of the invention, an agricultural harvesting head for harvesting standing crops in an agricultural field is provided, comprising:

an elongate frame having a first end and a second end that extends generally perpendicular to a direction of travel of the agricultural harvesting head as it travels through an agricultural field harvesting crops;

a first crop divider and a second crop divider fixed to the first end and the second end, respectively, of the elongate frame, wherein the first and second crop dividers extend forward in a direction of harvesting travel and further are each configured to divide approaching unharvested crop plants into a first portion to be received and harvested by the agricultural harvesting head, and a second portion to be left unharvested in the field, and further wherein the first and second crop dividers are pointed at their forward ends and become taller and wider in cross section in a rearward direction;

an elongate tube having a rotational axis, and having an overall length supported disposed above the elongate frame and extending generally perpendicular to the direction of travel;

a plurality of bat supports, wherein the plurality of bat supports are supported on and extend outwardly from the elongate tube, and wherein the plurality of bat supports are disposed at regular intervals along the overall length of the elongate tube; a plurality of bats, wherein each of said plurality of bats is elongate and has a longitudinal axis, wherein the plurality of bats extend parallel to the elongate tube, and wherein the plurality of bats are supported on the plurality of bat supports at locations that are equidistant from the elongate tube;

a first disc supported at a first end of the elongate tube and a first end of the plurality of bats, wherein the first disc is disposed perpendicular to the rotational axis of the elongate tube and perpendicular to the longitudinal axes of the plurality of bats, and wherein the first disc rotates with the elongate tube; and a wiper fixed to the first disc to rotate with the first disc, wherein the wiper is configured to wipe against an inwardly facing and generally vertical surface of the first crop divider.

A plurality of the wipers may be fixed to the first disc to rotate with the first disc, and the plurality of the wipers may be configured to wipe against an inwardly facing and generally vertical surface of the first crop divider.

The invention may further comprise a second wiper fixed to the second disc to rotate with the second disc, wherein the second wiper is configured to wipe against an inwardly facing and generally vertical surface of the second crop divider.

The plurality of the wipers may be disposed at an angle with respect to each other about a rotational axis of the first disc and further wherein the angle is selected from a group consisting of 60°, 120°, and 180° degrees.

The wiper may comprise a flexible plastic finger. The flexible plastic finger may have a proximal end and a distal end, and the flexible plastic finger may be fixed to the first disc at a proximal end and abuts the first crop divider at a distal end.

The wiper may rotate together with the first disc in a first rotational direction during crop harvesting, and further wherein the distal end of the flexible plastic finger extends forward of the proximal end of the flexible plastic finger in the first rotational direction.

The flexible plastic finger may be in the form of a spade.

The wiper may comprise a flexible plastic finger fixed to a mounting bracket, and wherein the mounting bracket is fixed to the first disc.

The mounting bracket may be sheet metal, and may comprise a first portion that is generally planar fixed to a second portion that is generally planar, and the first portion and the second portion may be disposed at an angle of between 120°-160° with respect to each other.

The first portion may be generally coplanar with the first disc.

The flexible plastic finger may be generally planar, and the second portion may be generally coplanar with the flexible plastic finger.

The flexible plastic finger may be disposed at an angle of between 20 and 60° with respect to the first disc.

DESCRIPTION OF THE PREFERRED EMBODIMENT

Figure 1:
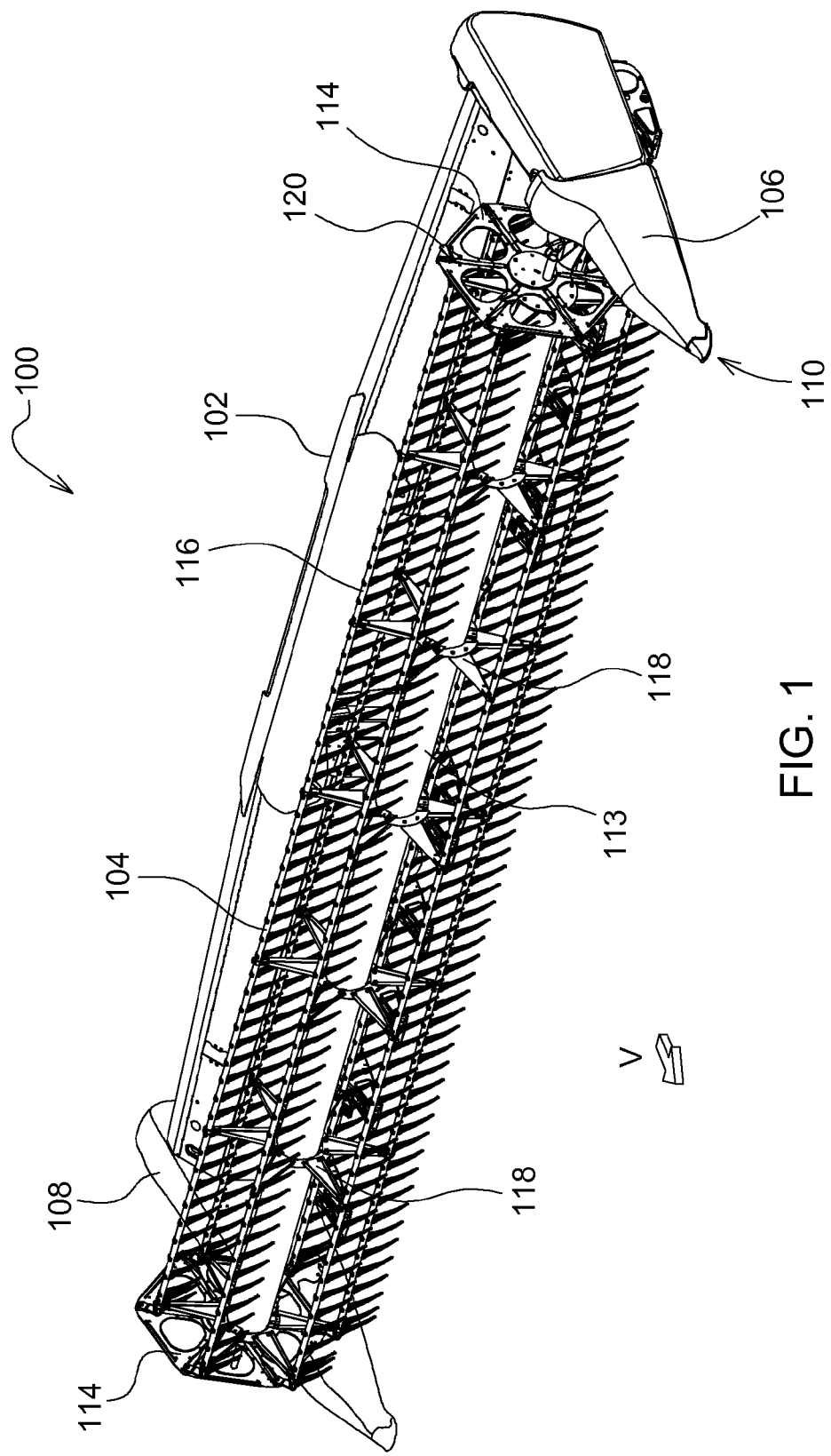
FIG. 1 is a perspective view of an agricultural harvesting head having a frame, a reel mounted on the frame, wipers mounted on the reel, and crop dividers at each end of the frame to divide the crop.

In FIG. 1, an agricultural harvesting head 100 is comprised of a frame 102 that supports a reel 104 and crop dividers 106 and 108.

The agricultural harvesting head 100 is mirror symmetric about a plane that extends normal to a longitudinal midpoint of the agricultural harvesting head. Thus, any description herein regarding the construction and operation of one end of the agricultural harvesting head 100 is the same for the other end of the agricultural harvesting head 100.

The agricultural harvesting head 100 is supported on a feederhouse (not shown) of an agricultural combine which carries the agricultural harvesting head 100 through the field to harvest crops.

The agricultural harvesting head 100 is carried to the field in a direction "V" that is transverse to the longitudinal extent of the frame 102.

The crop dividers 106, 108 are coupled at the rear ends to the frame 102 and extend forward in the direction "V". The crop dividers 106, 108 are generally at their forward ends enough to be inserted between adjacent plants and to push the adjacent crop plants to each side of the crop divider (i.e. to "divide" the crops) without damaging the crop plants. In essence, the crop dividers function like the teeth of a comb.

The forward end 110 of the crop dividers is narrow, and the top of the forward end 110 of the crop dividers is quite close to the ground. This arrangement permits the crop divider to be more easily inserted between the stalks of adjacent crop plants.

The reel 104 comprises an elongate central tube 113. The elongate central tube 113 has two opposing ends to which two discs 114 are fixed, respectively. The reel 104 further comprises bats 116 (in this example, six bats) that are elongate and have two opposing ends. The bats 116 extend between and are mounted to the two discs 114 at the two opposing ends of the bats 116, respectively.

The reel 104 also comprises a plurality of intermediate supports 118, often called "spiders", that are spaced apart along the length of the central tube 112. The intermediate supports 118 surround and support the bats 116 at regularly spaced intervals along the length of the bats 116.

The bats 116 are disposed equiangularly and at a constant distance from the central tube 113. The discs 114 are oriented perpendicular to the central longitudinal axis of the central tube 113. The central longitudinal axis is the axis about which the reel 104 rotates.

Several wipers 120 are fixed to the discs 114 at different angular axial positions about the longitudinal axis of rotation of the reel 104.

Figure 2:
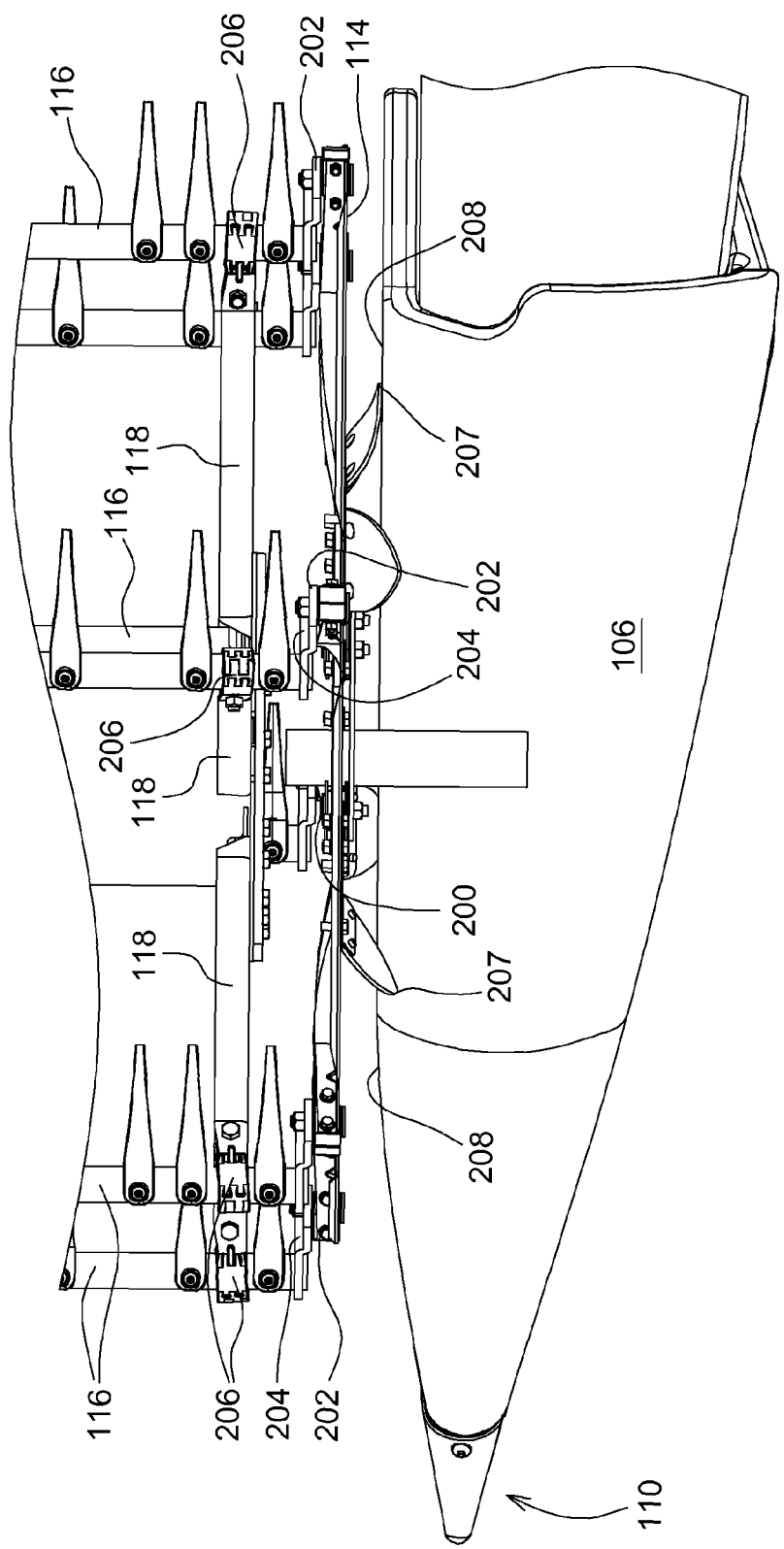
FIG. 2 is a plan view of the left end of the agricultural harvesting head of FIG. 1 showing the left end of the reel, the wipers mounted on the left end of the reel, and the crop dividers that are wiped by the wipers.

Referring to FIG. 2, the disc 114 is supported for rotation about a central axis of the disc 114 on several rollers 200. The rollers support the disc 114 in an offset position with respect to the central (longitudinal) rotational axis of the elongate central tube 113 and reel 104. This offset arrangement causes the disc 114 to rotate about a rotational axis that is disposed away from the central rotational axis of the elongate central tube 113 of the reel 104.

Several mechanical links 202 are mounted about the outermost extent of the disc 114. Each of these mechanical links 202 is pivotally coupled to a crank 204 that is fixed to the end of a corresponding bat 116. The offset rotation of the disc 114 together with the arrangement of the mechanical links 202 and the corresponding cranks 204 cause the bats to rotate back and forth with respect to mounts 206 fixed at the end of each of the six arms of the intermediate supports 118 as the reel 104 rotates about its rotational axis.

Each of the wipers 120 has a distal end 206 that faces outwardly towards the crop divider 106 and abuts the generally vertical and inwardly facing sidewall 208 of the crop divider 106 during at least a portion of the rotation of the reel 104. The distal end 206 of the wiper 120 is flexible, and thus flexes as the reel 104 rotates to maintain abutting contact with the inwardly facing sidewall 208.

This flexibility is beneficial in that it accommodates the curvature of the inwardly facing sidewall 208. As can be seen in FIG. 2 and is explained above, the crop divider 106 is curved and pointed. This curvature and pointedness permit the crop divider to more gently engage the crop close to the ground at its pointed end, and then gradually pull the adjacent crop plants apart.

Figure 3:
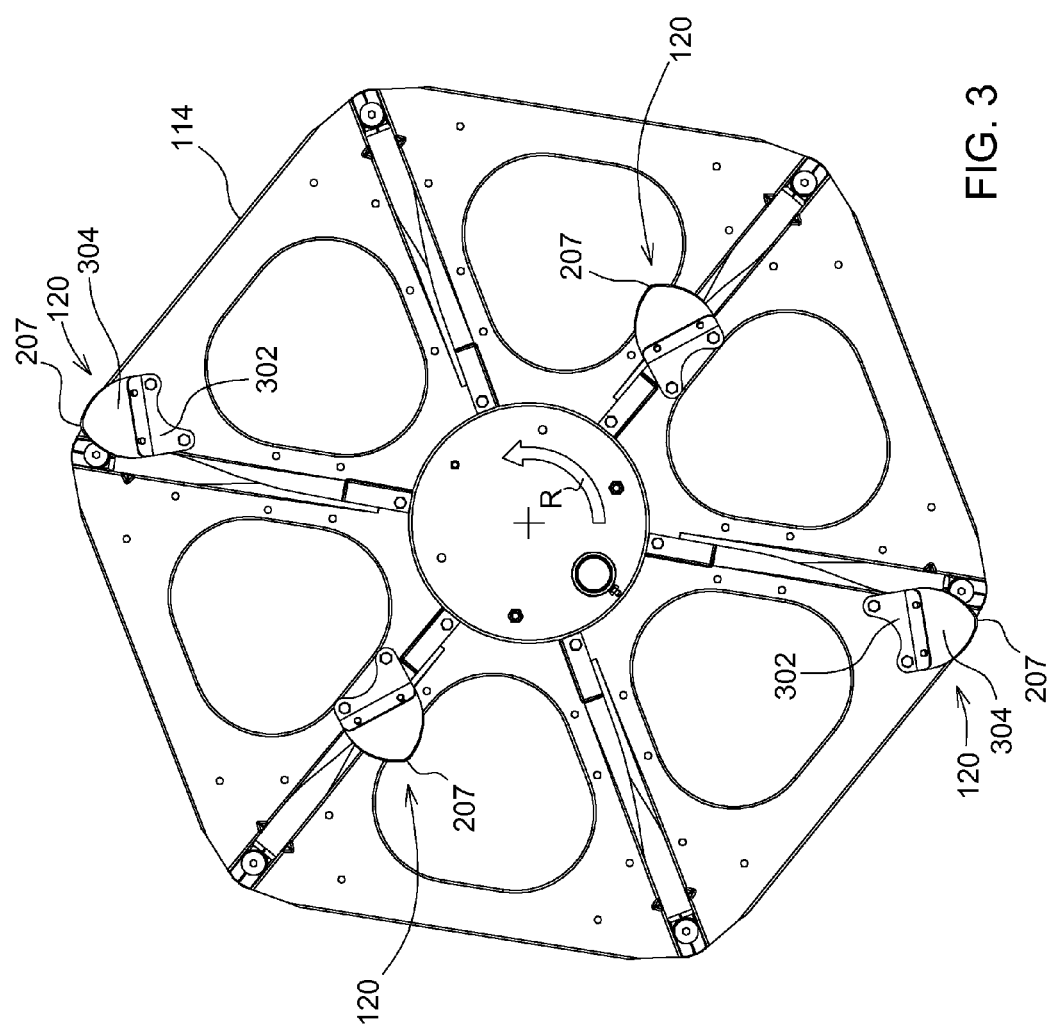
FIG. 3 is a left side view of the left end of the reel showing the locations of the wipers that are mounted on the reel.

Referring to FIG. 3, there are four wipers 120, each wiper being fixed to one of the six triangular panels 300 that make up the disc 114, which in this embodiment is hexagonal.

Each wiper 120 comprises a mounting bracket 302 to which a flexible plastic finger 304 is fixed. The mounting bracket 302 is typically made of metal such as steel, and is bolted to one of the triangular panels. The wipers 120 are regularly spaced at angles of 60° or 120° with respect to the adjacent wipers 120. The wipers are mounted at two different radial distances from the central rotational axis 306 of the disc 114. One radial position is approximately halfway between the central rotational axis 306 of the disc 114, and the other radial position is at the outer edge of the disc 114.

Each wiper 120 is fixed to the disc 114 such that the flexible plastic finger 304 extends forward in the direction of rotation "R" of the disc 114 (and reel 104). In this manner, each of the flexible plastic fingers 304 slides along the inwardly facing sidewall 208 (see FIG. 2) of the crop divider 106 lifting up plant stalks that are at risk of becoming wrapped around (i.e. "hair pinned") over the top of the rear of the crop dividers 106.

Figure 4:
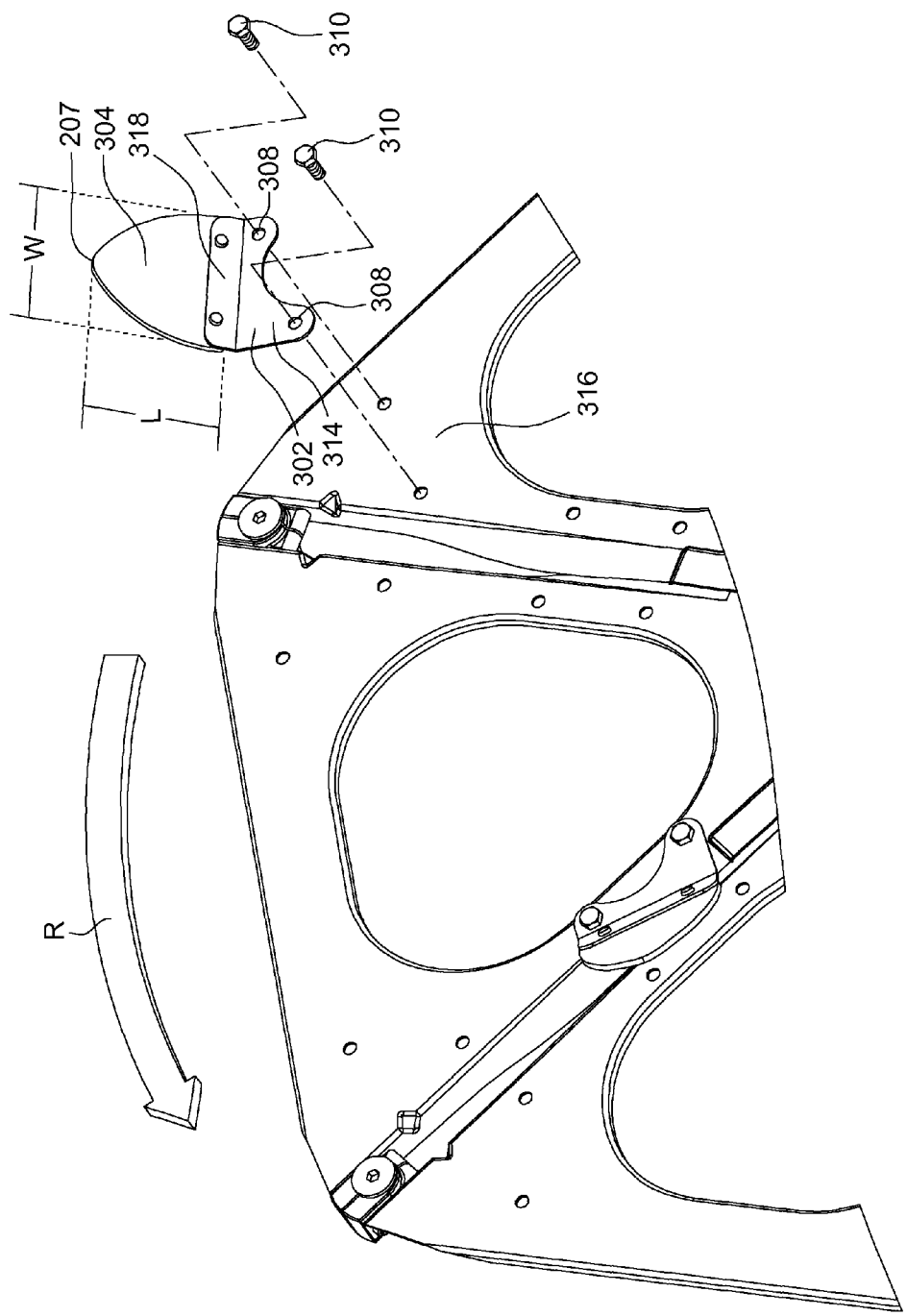
FIG. 4 is a fragmentary exploded perspective view of the left end of the reel of FIG. 3 showing the mounting arrangement of the wipers on the left end of the reel.

Referring to FIG. 4, the flexible plastic finger 304 is shaped like a shovel, spade, leaf or petal. The distal end 206 is a gently rounded tip for maximum flexibility at the point of contact with the inwardly facing sidewall 208 of the crop divider 108. The width "W" of the flexible plastic finger 304 increases as the flexible plastic finger 304 approaches the mounting bracket 302 by which it is fixed to the disc 114. The width "W" of the flexible plastic finger 304 at the base of the flexible plastic finger 304 is substantially equal to the length "L" overall of the flexible plastic finger 304.

The flexible plastic finger 304 is riveted to the mounting bracket 302 with two rivets that are spaced apart. Similarly, the mounting bracket 302 has two holes 308 that are configured to receive two threaded fasteners 310 such as screws or bolts 312. The two holes 308 are also spaced apart at opposite sides of the mounting bracket.

The mounting bracket 302 comprises a first portion 314 that is generally planar and abuts the parallel planar surface 316 of the disc 114. The two holes 308 extend through the first portion 314. The mounting bracket 302 also comprises a second portion 318 that is generally planar and is disposed at an angle with respect to the first portion 314. The second portion 318 is parallel to and abuts the plane of the flexible plastic finger 304. The first portion 314 and the second portion 318 are disposed at an angle with respect to each other. That angle is between 160° and 120°. This permits the flexible plastic finger 304 to be made out of a flat sheet of plastic stock and held at an angle of between 20° and 60° with respect to the disc 114. It is the bend between the first and second portions that defines the angle (20°-60° at which the flat plastic finger is held with respect to the disc 114 and with respect to the inwardly facing sidewall 208 of the crop divider 108.

The second portion 318 is disposed forward of the first portion 314 in the direction of rotation "R" of the disc 114. The first portion 314 and the second portion 318 are formed from a single piece of steel sheet that is punched, pierced (to create the four holes), and bent (to create the angle between the two panels) in a sequence of metal stamping operations.

Having described the preferred embodiment, it will become apparent that various modifications can be made without departing from the scope of the invention as defined in the accompanying claims.

The invention claimed is:

1. An agricultural harvesting head for harvesting standing crops in an agricultural field, comprising:
   an elongate frame having a first end and a second end that extends generally perpendicular to a direction of travel of the agricultural harvesting head as it travels through an agricultural field harvesting crops;
   a first crop divider and a second crop divider fixed to the first end and the second end, respectively, of the elongate frame, wherein the first and second crop dividers extend forward in a direction of harvesting travel and further are each configured to divide approaching unharvested crop plants into a first portion to be received and harvested by the agricultural harvesting head, and a second portion to be left unharvested in the field, and further wherein the first and second crop dividers are pointed at their forward ends and become taller and wider in cross section in a rearward direction;
   an elongate tube having a rotational axis, and having an overall length supported disposed above the elongate frame and extending generally perpendicular to the direction of travel;
   a plurality of bat supports, wherein the plurality of bat supports are supported on and extend outwardly from the elongate tube, and wherein the plurality of bat supports are disposed at regular intervals along the overall length of the elongate tube;
   a plurality of bats, wherein each of said plurality of bats is elongate and has a longitudinal axis, wherein the plurality of bats extend parallel to the elongate tube, and wherein the plurality of bats are supported on the plurality of bat supports at locations that are equidistant from the elongate tube;
   a first disc supported at a first end of the elongate tube and a first end of the plurality of bats, wherein the first disc is disposed perpendicular to the rotational axis of the elongate tube and perpendicular to the longitudinal axes of the plurality of bats, and wherein the first disc rotates with the elongate tube; and
   a wiper fixed to the first disc to rotate with the first disc, wherein the wiper is configured to wipe against an inwardly facing and generally vertical surface of the first crop divider.

2. The agricultural harvesting head of claim 1, wherein a plurality of the wiper are fixed to the first disc to rotate with the first disc, and wherein the plurality of the wipers are configured to wipe against an inwardly facing and generally vertical surface of the first crop divider.

3. The agricultural harvesting head of claim 2, further comprising a second wiper fixed to a second disc to rotate with the second disc, wherein the second wiper is configured to wipe against an inwardly facing and generally vertical surface of the second crop divider.

4. The agricultural harvesting head of claim 2, wherein the plurality of the wipers are disposed at an angle with respect to each other about a rotational axis of the first disc and further wherein the angle is selected from a group consisting of 60°, 120°, and 180° degrees.

5. The agricultural harvesting head of claim 1, wherein the wiper comprises a flexible plastic finger.

6. The agricultural harvesting head of claim 5, wherein the flexible plastic finger has a proximal end and a distal end, and further wherein the flexible plastic finger is fixed to the first disc at a proximal end and abuts the first crop divider at a distal end.

7. The agricultural harvesting head of claim 6, wherein the wiper rotates together with the first disc in a first rotational direction during crop harvesting, and further wherein the distal end of the flexible plastic finger extends forward of the proximal end of the flexible plastic finger in the first rotational direction.

8. The agricultural harvesting head of claim 7, wherein the flexible plastic finger is in the form of a spade.

9. The agricultural harvesting head of claim 1, wherein the wiper comprises a flexible plastic finger fixed to a mounting bracket, and wherein the mounting bracket is fixed to the first disc.

10. The agricultural harvesting head of claim 9, wherein the mounting bracket is sheet metal, and comprises a first portion that is generally planar fixed to a second portion that is generally planar, and the first portion and the second portion are disposed at an angle of between 120°-160° with respect to each other.

11. The agricultural harvesting head of claim 10, wherein the first portion is generally coplanar with the first disc.

12. The agricultural harvesting head of claim 11, wherein the flexible plastic finger is generally planar, and further wherein second portion is generally coplanar with the flexible plastic finger.

13. The agricultural harvesting head of claim 9, wherein the flexible plastic finger is disposed at an angle of between 20° and 60° with respect to the first disc.

* * * * *